US010103961B2

(12) United States Patent
Michaud et al.

(10) Patent No.: US 10,103,961 B2
(45) Date of Patent: Oct. 16, 2018

(54) COLLECTING CLIENT-SIDE APPLICATION PERFORMANCE MONITORING INFORMATION

(71) Applicant: Teachers Insurance and Annuity Association of America, New York, NY (US)

(72) Inventors: Ethan Luke Michaud, Harrisburg, NC (US); Mathew Wade Pickering, Port Orange, FL (US); Rafael Pedro Olaso, Mendon, MA (US); Matthew M. Bechard, Sandwich, MA (US); Janusz M. Juda, Natick, MA (US); James Ronald Hixon, Waxhaw, NC (US); William Val Arneth, III, Westborough, MA (US); Nathaniel John Bates, Portsmouth, NH (US); Latrisha Devon Whitehead, Huntersville, NC (US); Gary Robert Couture, Hollis, NH (US); Louis Anthony Iannucci, Harrisburg, NC (US); Scott M. Blandford, Hopewell, NJ (US)

(73) Assignee: Teacher Insurance & Annuity Association of America, New York, NY (US)

( * ) Notice: Subject to any disclaimer, the term of this patent is extended or adjusted under 35 U.S.C. 154(b) by 187 days.

(21) Appl. No.: 14/340,805

(22) Filed: Jul. 25, 2014

(65) Prior Publication Data

US 2016/0028805 A1    Jan. 28, 2016

(51) Int. Cl.
*G06F 15/16* (2006.01)
*H04L 12/26* (2006.01)
(Continued)

(52) U.S. Cl.
CPC ............ *H04L 43/12* (2013.01); *H04L 41/046* (2013.01); *H04L 67/1002* (2013.01)

(58) Field of Classification Search
CPC ............... H04L 29/08072; H04L 29/06; H04L 29/0809; H04L 29/06047; H04L 12/2602; H04L 41/22; H04L 43/00; G06Q 30/02
(Continued)

(56) References Cited

U.S. PATENT DOCUMENTS 7,523,191 B1 * 4/2009 Thomas .............. G06F 11/3438
709/202
7,725,574 B2 * 5/2010 O'Connell .......... G06F 11/0709
709/219
(Continued)

*Primary Examiner* — Mahran Abu Roumi
(74) *Attorney, Agent, or Firm* — Lowenstein Sandler LLP

(57) ABSTRACT

Systems and methods for collecting client-side application performance monitoring (APM) information in distributed computer systems. An example method may comprise: inserting a script code fragment into an electronic document to be transmitted to a client computing device, wherein the script code fragment is to issue a request for loading an object from a second computer system, the request comprising at least one of: a parameter of a client browser executed by the client computing device, a parameter of an application being executed within the client browser, or a parameter of a current session of the client browser; and transmitting the electronic document to at least one of: the second computer system or the client computing device.

20 Claims, 4 Drawing Sheets

(51) Int. Cl.
*H04L 12/24* (2006.01)
*H04L 29/08* (2006.01)

(58) Field of Classification Search
USPC ........................................................ 709/203
See application file for complete search history.

(56) References Cited

U.S. PATENT DOCUMENTS

| | | | | |
|---|---|---|---|---|
| 8,751,925 B1* | 6/2014 | Zhang | ................... | G06F 17/227 715/234 |
| 2004/0064531 A1* | 4/2004 | Wisner | ................... | G06Q 30/02 709/221 |
| 2005/0076329 A1* | 4/2005 | Hsu | ................... | G06F 17/3064 717/105 |
| 2008/0177648 A1* | 7/2008 | Doyle | ................... | G06Q 30/06 705/35 |
| 2009/0083155 A1* | 3/2009 | Tudor | ................... | G06Q 10/06 705/14.69 |
| 2009/0125579 A1* | 5/2009 | Saillet | ................... | H04L 67/34 709/203 |
| 2009/0262741 A1* | 10/2009 | Jungck | .............. | H04L 29/12066 370/392 |
| 2010/0049847 A1* | 2/2010 | Muret | ................. | C07K 14/705 709/224 |
| 2011/0131518 A1* | 6/2011 | Ohashi | ................ | H04L 12/2812 715/769 |
| 2012/0090030 A1* | 4/2012 | Rapaport | ............ | H04L 63/1441 726/23 |
| 2012/0124318 A1* | 5/2012 | Bivens | ................ | G06F 11/3409 711/170 |
| 2012/0185588 A1* | 7/2012 | Error | ..................... | G06Q 30/02 709/224 |
| 2013/0198266 A1* | 8/2013 | Kiley | ..................... | H04L 67/34 709/203 |
| 2013/0204961 A1* | 8/2013 | Fliam | ................. | H04L 67/2885 709/214 |
| 2015/0244596 A1* | 8/2015 | Abuelsaad | ............. | H04L 67/10 709/224 |

* cited by examiner

COLLECTING CLIENT-SIDE APPLICATION PERFORMANCE MONITORING INFORMATION

TECHNICAL FIELD

The present disclosure is generally related to distributed computer systems, and is more specifically related to collecting client-side application performance monitoring (APM) information in distributed computer systems.

BACKGROUND

A distributed computer system may comprise one or more components, including, e.g., web servers, application servers, database servers, and/or various other components. A plurality of clients may access the distributed computer system via a network comprising one or more local area networks and/or one or more wide area networks (e.g., the Internet). Distributed computer systems may employ various mechanisms for collecting, storing, and processing client-side APM information, such as parameters of the client browser, parameters of applications being executed within the client browser, and/or parameters of the current session of the client browser.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
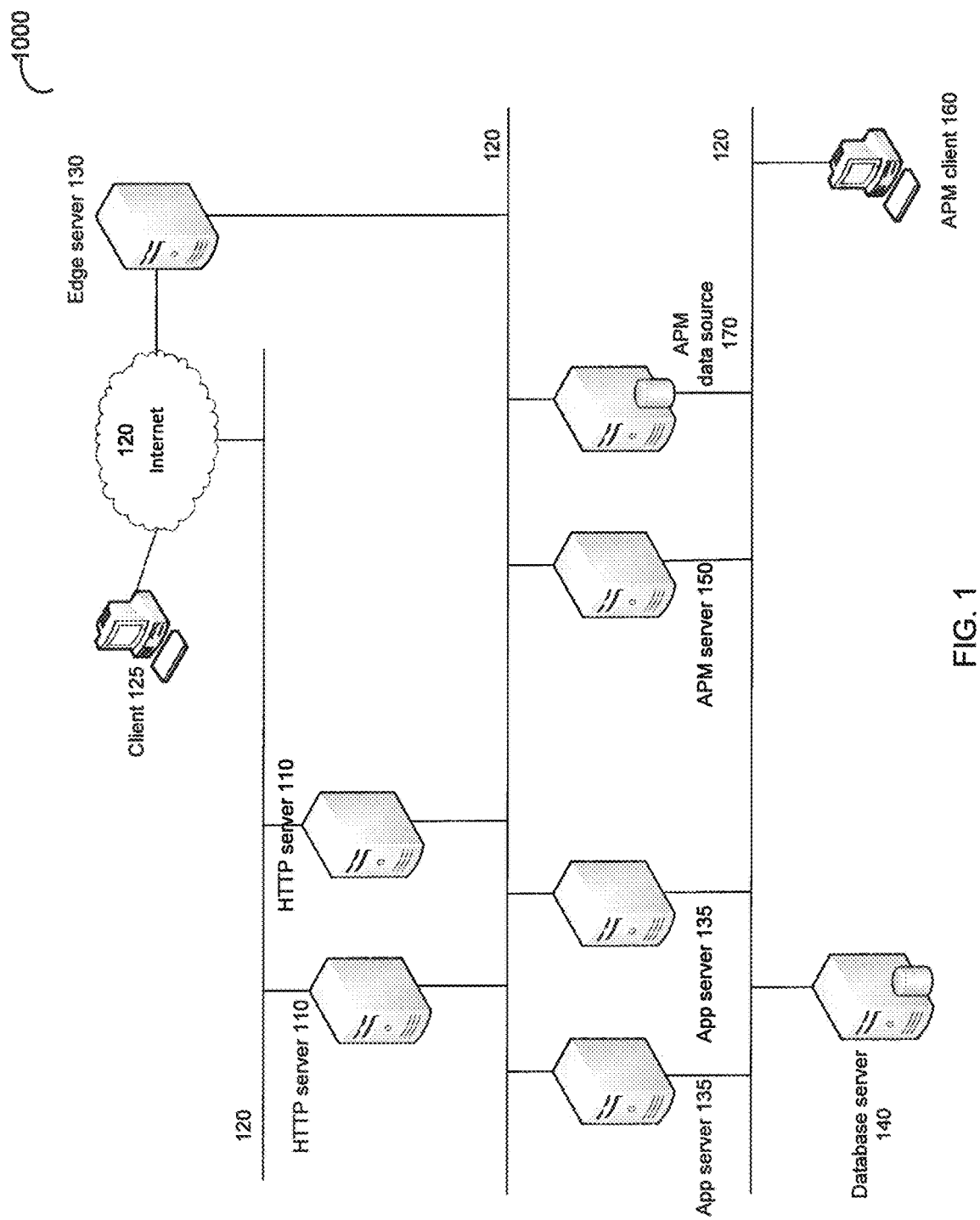
FIG. 1 schematically illustrates a high-level network diagram of an example distributed computer system, in accordance with one or more aspects of the present disclosure.

Described herein are methods and systems for collecting client-side APM information in distributed computer systems.

A distributed computer system may comprise one or more components, including, e.g., edge servers (also referred to as server-side proxy servers or content delivery servers), web servers, application servers, database servers, and/or various other components. A plurality of clients may access the distributed computer system via a network comprising one or more local area networks and/or one or more wide area networks (e.g., the Internet).

In certain implementations, a client computing device may be configured to execute a web browser. "Web browser" or "browser" herein shall refer to a software application for retrieving, presenting and navigating through information resources represented by various electronic documents. An information resource may be provided by a web application. "Web application" herein shall refer to a software application having a client part that is designed to run in a web browser. The client part may be created in a browser-supported programming language (such as JavaScript, HTML, or their combination) and thus may rely on a web browser to render its output and/or receive GUI-based user input.

Application performance metrics of software applications being executed by distributed computer systems may utilize various client-side information items, including parameters of the client browser, parameters of applications being executed within the client browser, and/or parameters of the current session of the client browser. Client-side application performance metrics may include various end user experience (EUE) metrics, such as the number of requests issued by a client within a given time period, the request processing time (e.g., measured as the page load time), and/or the number of errors received in response to the client requests. Client-side application performance metrics may further include various metrics related to usage levels of client-side computing resources by a software application, such as the processor usage level at the client computing device, the amount of memory used by the application at the client computing device, and/or the amount of data transferred by the application over the network as measured by the client computing device.

In certain implementations, a server may inject, into certain web pages to be served to a client browser, one or more script code fragments designed to collect various client-side APM parameters that may be utilized to determine client-side application performance metrics. Such APM parameters may include parameters of the client browser, parameters of applications being executed within the client browser, and/or parameters of the current session of the client browser. The injected code may incorporate the collected client-side information into one or more parameters of a request (e.g., an HTTP GET request) to be issued by the client browser executing the script code fragment with respect to a static object residing at an edge server. In an illustrative example, the static object may be provided by a single-pixel transparent image so that it may be rendered by the client browser anywhere on the screen without visually interfering with other screen objects.

Responsive to receiving the HTTP GET (or other) request, the edge server may create a log file entry to reflect the parameters of the received request. The edge server may further transmit the received request and/or the log file entry to an application performance monitoring system for further processing.

Thus, in accordance with one or more aspects of the present disclosure, the collection and aggregation of client-side APM parameters may effectively be shifted to one or more edge servers, which would reduce the network traffic and/or processing load in the application servers.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates a high-level network diagram of an example distributed computer system 1000, in accordance with one or more aspects of the present disclosure. Firewalls, load balancers, network switches and various other components may be omitted from FIG. 1 for clarity. Computer systems, appliances, and network segments are shown in FIG. 1 for illustrative purposes only and do not in any way limit the scope of the present disclosure. Various other computer systems, components, appliances, and/or methods of their interconnection may be compatible with the methods and systems described herein for collecting client-side APM information in distributed computer systems.

In an illustrative example, the distributed computer system 1000 may comprise one or more HTTP servers 110, which may be configured to receive, over one or more networks 120, requests from a plurality of client computer systems 125. Networks 120 may comprise one or more local area networks and/or one or more wide area networks. Responsive to receiving a client-initiated request, an HTTP server 110 may parse the request and issue one or more requests to one or more application servers 135. An application server 135 may process a request received from an HTTP server 110 and produce a response to be returned to the client computer system 125. The request processing by application server 135 may comprise issuing one or more requests to one or more database servers 140. The HTTP server 110 may then wrap the response produced by the application server 135 into one or more HTTP response messages and return the response messages to the client computer system 125.

In certain implementations, a request initiated by a client computer system 125 may initially be routed to an edge server 130, which may then select, e.g., based on a load balancing scheme, an HTTP server 110 to which the client request should be routed. In an illustrative example, a plurality of edge servers 130 may be geographically distributed so that a request initiated by a client computer system 125 would be routed to an edge server 130, which is selected based on the client geographic location and/or other request parameters. The edge server 130 may then forward the client-initiated request to a dynamically selected HTTP server 110.

In addition to performing the load balancing, edge servers 130 may serve static content in response to client HTTP requests, and/or perform various other tasks. In accordance with one or more aspects of the present disclosure, edge servers 130 may facilitate the collection and aggregation of client-side APM parameters, as described in more details herein below.

"Edge server" herein shall refer to a computer system configured to accept incoming requests from a plurality of clients and to either satisfy such requests by returning various locally stored objects (e.g., static content) or forward at least some of the requests to an application server layer for further processing. Examples of edge servers include server-side HTTP proxy servers, HTTP load balancers, content delivery servers, and various other servers. Edge servers may be geographically distributed in order to reduce the client-server round-trip time at least for static content requests.

The above described client request processing serves as an illustrative example only and does not in any way limit the scope of the present disclosure. Various other client request processing components and/or methods may be compatible with the methods and systems for collecting client-side APM information in distributed computer systems.

In certain implementations, the distributed computer system 1000 may further comprise one or more APM components, which may be represented by one or more software modules residing on one or more dedicated monitoring appliances and/or collocated with other functional components of the distributed computer system 1000. In an illustrative example, the APM components may include an APM server 150, an APM client 160, and an APM data source 170. The latter may be provided by file or block-level storage, relational databases, and/or data storage devices or systems of various other types. The distributed computer system 1000 may further comprise a data visualization subsystem (not shown in FIG. 1) designed to facilitate the visualization of the APM data by the APM client 160.

In accordance with one or more aspects of the present disclosure, a server (e.g., an application server 135 or an edge server 130) may inject, into certain web pages to be served to a browser being executed by a client computer system 125, one or more script code fragments designed to collect various client-side APM parameters that may be utilized to determine client-side application performance metrics. Such APM parameters may include parameters of the client browser, parameters of applications being executed within the client browser, and/or parameters of the current session of the client browser. The injected code may incorporate the collected client-side information into one or more parameters of a request (e.g., an HTTP GET request) to be issued by the client browser executing the script code fragment.

In order to shift the collection and aggregation of client-side APM parameters to one or more edge servers 130, the injected code may direct the HTTP GET request to a static object residing at an edge server 130. In an illustrative example, the static object may be provided by a single-pixel transparent image so that it may be rendered by the client browser anywhere on the screen without visually interfering with other screen objects.

Responsive to receiving the HTTP GET request, the edge server 130 may create a log file entry to reflect the parameters of the received request. The edge server 130 may further transmit the received request and/or the log file entry to an APM data source 170 and/or APM server 150 for further processing. In certain implementations, the message transmission by edge server 130 may be performed over a dedicated connection to the APM data source 170 and/or APM server 150, in order to enable the real-time APM data collection and subsequent processing.

Figure 2:
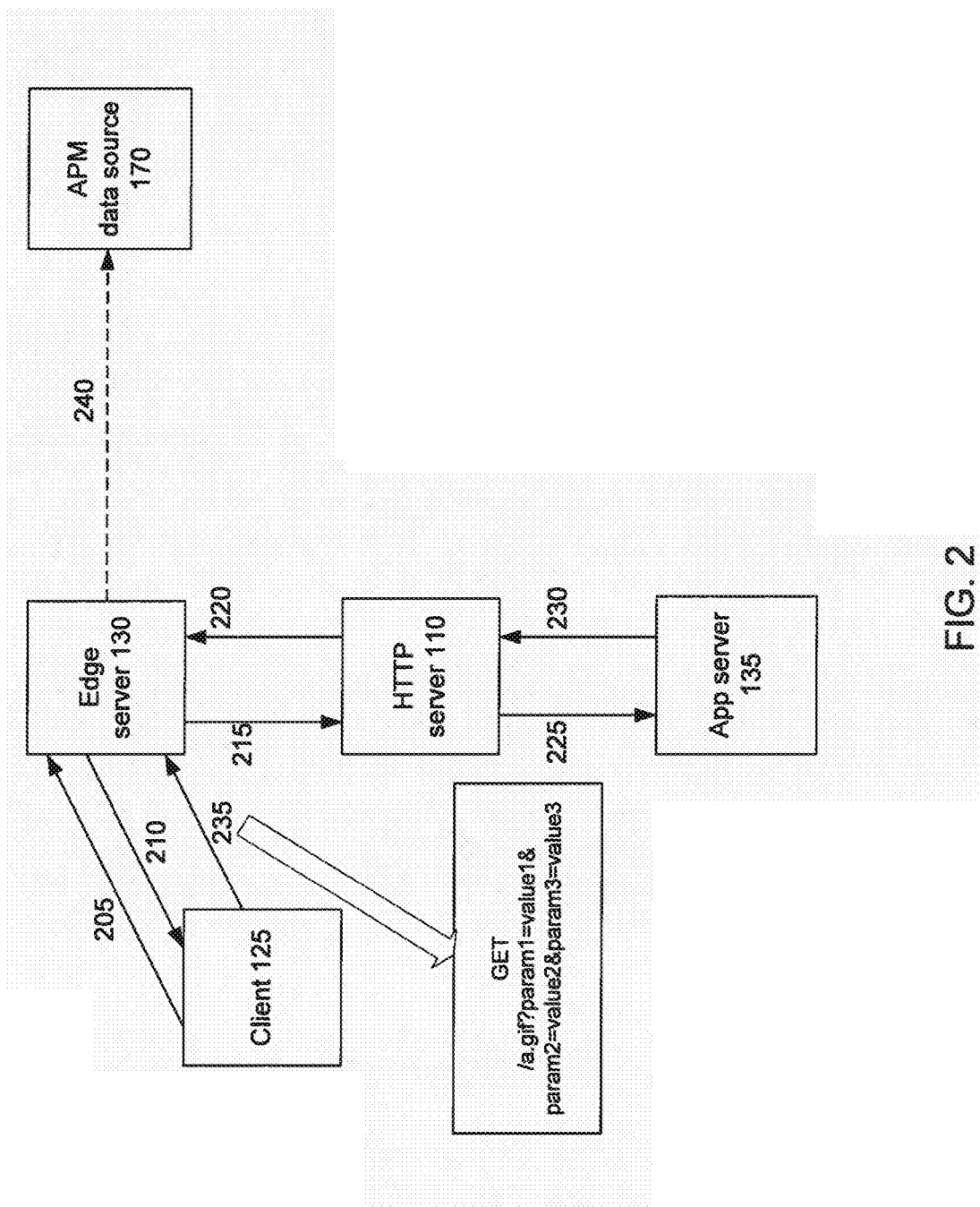
FIG. 2 schematically illustrates an example of request processing by the example distributed computer system, in accordance with one or more aspects of the present disclosure.

FIG. 2 schematically illustrates an example of request processing by the distributed computer system 1000 of FIG. 1, in accordance with one or more aspects of the present disclosure. In an illustrative example, a browser session may be initiated by a client computer system 125 transmitting, to an edge server 130 which may be selected based on the client geographic location, an HTTP GET request 205 for certain digital content (e.g., index.html file).

If the requested content is static and/or cacheable, the edge server 130 may retrieve the requested content from the file cache (e.g., provided by a local or network file system accessible by the edge server 130). Otherwise, responsive to determining that the requested content could not be found in the file cache, the edge server 130 may select, e.g., based on a load balancing scheme, an HTTP server 110 to which the client request should be forwarded. The edge server 130 may transmit, to the HTTP server 110, an HTTP request 215 for index.html file. Upon parsing the received HTTP request 215, the HTTP server 110 may retrieve the requested content from the local file system and/or from an application server 135 (via a request/response sequence 225-230). The HTTP server 110 may then respond by transmitting an HTTP response 220 comprising index.html file back to the edge server 130, which may forward index.html file to the client computer system 125 within an HTTP response message 210.

Any of the content originating or forwarding servers (e.g., the edge server 130, HTTP server 110, or application server 135) may inject one or more script code fragments into certain web pages (including the example index.html file) to be transmitted to a browser being executed by the client computer system 125. The script code fragments may be designed to collect various client-side APM parameters that may be utilized to determine client-side application performance metrics. In certain implementations, the code fragments to be injected into certain web pages may be retrieved by a content originating or forwarding server (e.g., the edge server 130, HTTP server 110, or application server 135) from a local or network file system. Alternatively, the code fragments may be dynamically generated by the content originating or forwarding server based on one or more template files and/or one or more configurable parameters specifying the client-side APM parameters to be collected by the injected code.

Such client-side APM parameters may include parameters of the client browser, parameters of applications being executed within the client browser, and/or parameters of the current session of the client browser. Examples of client browser parameters may include the type and version of the client browser, the type and version of the operating system of the client computing device, the window size of the client browser, and the physical size of the client screen. Examples of application parameters include the amount of memory available to the browser and the server response time measured by an application being executed within the browser. Examples of session parameters include an identifier of the active browser session and an identifier of the user associated with the active browser session.

In an illustrative example, the injected code may comprise one or more Javascript functions. Alternatively, other client-side scripting languages may be utilized for generating the injectable code.

The injected code may incorporate the collected client-side information into one or more parameters of a request (e.g., an HTTP GET request 235) to be issued by the client browser executing the script code fragment.

In order to shift the collection and aggregation of client-side APM parameters to one or more edge servers 130, the injected code may direct the HTTP GET request 235 to a static object residing at an edge server 130. In an illustrative example, the static object may be provided by a single-pixel transparent image so that it may be rendered by the client browser anywhere on the screen without visually interfering with other screen objects.

Responsive to receiving the HTTP GET request 235, the edge server 130 may create a log file entry to reflect the parameters of the received request. The edge server 130 may further transmit a message 240 comprising at least part of the received HTTP GET request and/or at least part of the log file entry to an APM data source 170. In certain implementations, the message transmission by edge server 130 may be performed over a dedicated connection to the APM data source 170, in order to enable the real-time APM data collection and subsequent processing.

In certain implementations, edge server 130 may be further configured to ascertain whether an incoming message (e.g., an HTTP request 235) comprises a transaction identifier that has previously been inserted by other components of the distributed computer system. In an illustrative example, the transaction identifier may be packaged in an HTTP header (e.g., X-INFO header or a custom HTTP header), and hence may be recognized identifying a text pattern corresponding to the HTTP header within the HTTP request. In another illustrative example, the transaction identifier may be recognized based on other pre-defined byte patterns. Responsive to determining that an incoming message does not comprise a transaction identifier, the edge server 130 may generate a new transaction identifier and insert the generated transaction identifier into the logging message 240. In certain implementations, the transaction identifier may be represented by a globally unique value (GUID). In an illustrative example, the transaction identifier may be represented by a 128-bit GUID, such as { 9543EF67-2EC3-FFAD-3BB2-D29A65DB42EF}. In another illustrative example, the transaction identifier may be represented by a combination of a GUID and a server identifier, the latter identifying the server that generated the transaction identifier.

The above described methods for collecting client-side APM information serve as illustrative examples only and do not in any way limit the scope of the present disclosure.

Figure 3:
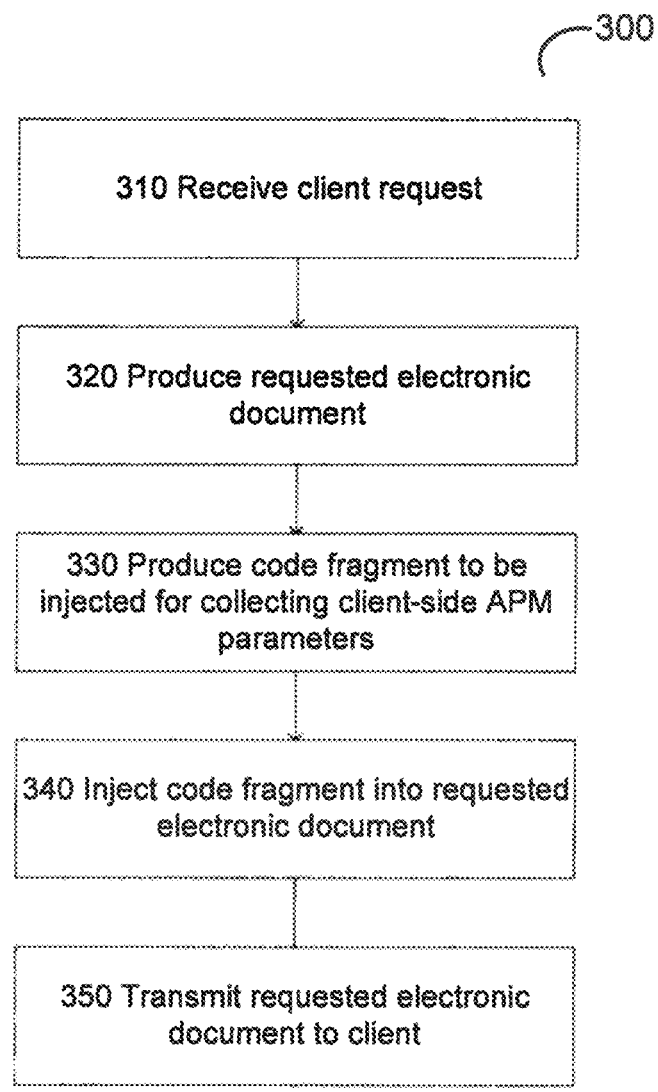
FIG. 3 depicts a flow diagram of an example method for collecting client-side APM information in distributed computer systems, in accordance with one or more aspects of the present disclosure.

FIG. 3 depicts a flow diagram of an example method 300 for collecting client-side APM information in distributed computer systems, in accordance with one or more aspects of the present disclosure. Method 300 and/or each of its individual functions, routines, subroutines, or operations may be performed by one or more general purpose and/or specialized processing devices. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by an example computer system 500 described herein below with references to FIG. 4.

Referring to FIG. 3, at block 310, the computer system implementing the method may receive a client request for an electronic document (e.g., a web page).

At block 320, the computer system may retrieve the requested electronic documents from the file cache (e.g., provided by a local or network file system) or request the electronic documents from another computer system (e.g., an HTTP server or an application server), as described in more details herein above.

At block 330, the computer system may produce a code fragment to be injected into one or more requested electronic documents for collecting client-side APM information. Such APM information may include parameters of the client browser, parameters of applications being executed within the client browser, and/or parameters of the current session of the client browser, as described in more details herein above.

In an illustrative example, the injected code may comprise one or more Javascript functions. Alternatively, other client-side scripting languages may be utilized for generating the injectable code. The injected code may incorporate the collected client-side information into one or more parameters of a request (e.g., an HTTP GET request) to be issued by the client browser executing the script code fragment. The injected code may direct the HTTP GET request to a static object provided by a single-pixel transparent image so that it may be rendered by the client browser anywhere on the screen without visually interfering with other screen objects. In certain implementations, the static object may reside at an edge server thus shifting the collection and aggregation of client-side APM parameters from application servers in order to reduce the network traffic and/or processing load in the application servers, as described in more details herein above.

At block 340, the computer system may inject the code fragment into one or more requested electronic documents.

At block 350, the computer system may transmit the requested electronic documents to the client. Responsive to completing operations referenced by the block 350, the method may terminate.

Figure 4:
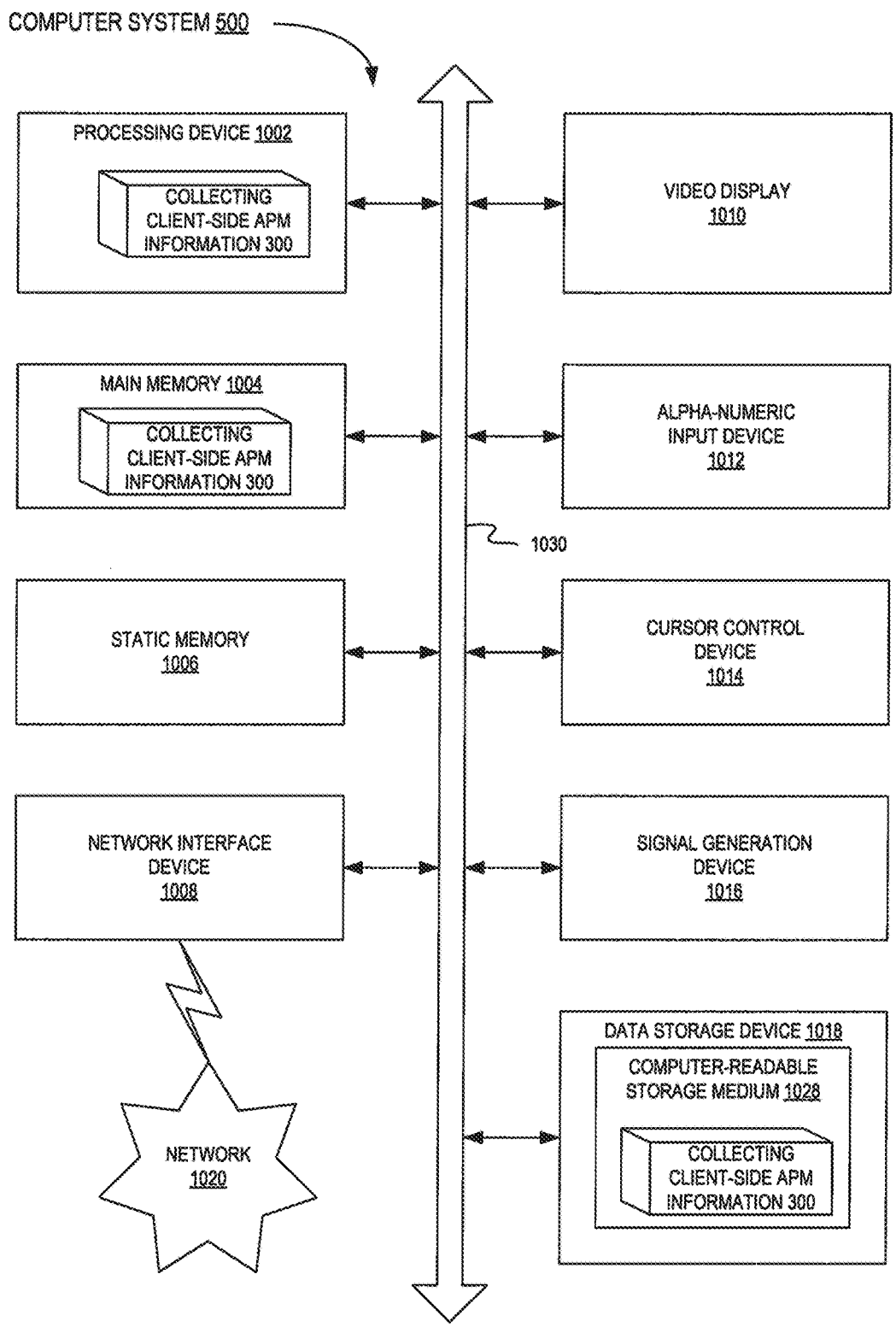
FIG. 4 depicts a block diagram of an illustrative computer system operating in accordance with one or more aspects of the present disclosure.

FIG. 4 illustrates a diagrammatic representation of a computer system 500 within which a set of instructions for causing the computing device to perform the methods discussed herein may be executed. The computer system 500 may be connected to other computing devices in a LAN, an intranet, an extranet, and/or the Internet. The computer system 500 may operate in the capacity of a server machine in client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may implement the above described method 300 for collecting client-side APM information in distributed computer systems.

The example computer system 500 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the method 300 for collecting client-side APM information in distributed computer systems, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 300 for collecting client-side APM information in distributed computer systems, in accordance with one or more aspects of the present disclosure) implementing any one or more of the methods or functions described herein. Instructions implementing the method 300 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
receiving, by a server-side HyperText Transfer Protocol (HTTP) proxy server, a first request initiated by a client computing device, the first request specifying an electronic document;
responsive to determining that the electronic document is missing from a file cache, identifying, based on a load balancing scheme, an HTTP server and requesting the electronic document from the HTTP server;
generating, based on a template file, a code implementing a second request for loading a static object residing on the server-side HTTP proxy server, the second request comprising an application performance monitoring (APM) parameter of an application being executed by the client computing device, wherein the APM parameter is represented by one of: an amount of data transferred by the application, a number of requests issued by the application within a given time period, a processor usage level at the client computing device, an amount of memory available to the application, a server response time measured by the application, or a number of errors received in response to requests transmitted by the application;
inserting the code into the electronic document;
transmitting the electronic document to the client computing device;
responsive to receiving, from the client computing device, a third request for loading the static object identified by the code, transmitting to an APM system a message comprising at least part of the third request and the value of the APM parameter specified by the third request; and
creating a log record comprising at least part of the third request.

2. The method of claim 1, wherein the static object is provided by a transparent single-pixel image.

3. The method of claim 1, wherein the code comprises a Javascript function.

4. The method of claim 1, wherein the first request is an HTTP GET request.

5. The method of claim 1, wherein transmitting the message to the APM system is performed over a dedicated connection.

6. The method of claim 1, wherein the electronic document retrieved from the HTTP server comprises a second code for loading a second static object residing on the HTTP server.

7. The method of claim 1, wherein the message further comprises a transaction identifier.

8. A computer system implementing a server-side HyperText Transfer Protocol (HTTP) proxy server, the computer system comprising:
a memory; and
a processor communicatively coupled to the memory, the processor configured to:
receive a first request initiated by a client computing device, the first request specifying an electronic document;
responsive to determining that the electronic document is missing from a file cache, identify, based on a load balancing scheme, an HTTP server and request the electronic document from the HTTP server;
generate, based on a template file, a code implementing a second request for loading a static object residing on the server-side HTTP proxy server, the second request comprising an application performance monitoring (APM) parameter of an application being executed by the client computing device wherein the APM parameter is represented by one of: an amount of data transferred by the application, a number of requests issued by the application within a given time period, a processor usage level at the client computing device, an amount of memory available to the application, a server response time measured by the application, or a number of errors received in response to requests transmitted by the application;
insert the code into the electronic document;
transmit the electronic document to the client computing device;
responsive to receiving, from the client computing device, a third request for loading the static object identified by the code, transmit to an APM system a message comprising at least part of the third request and the value of the APM parameter specified by the third request; and
create a log record comprising at least part of the third request.

9. The computer system of claim 8, wherein the static object is provided by a transparent single-pixel image.

10. The computer system of claim 8, wherein the code comprises a Javascript function.

11. The computer system of claim 8, wherein the first request is an HTTP GET request.

12. The computer system of claim 8, wherein transmitting the message to the APM system is performed over a dedicated connection.

13. The computer system of claim 8, wherein the electronic document retrieved from the HTTP server comprises a second code for loading a second static object residing on the HTTP server.

14. The computer system of claim 8, wherein the message further comprises a transaction identifier.

15. A computer-readable non-transitory storage medium comprising executable instructions that, when executed by a computer system implementing a server-side HyperText Transfer Protocol (HTTP) proxy server, cause the computer system to perform operations comprising:
receiving a first request initiated by a client computing device, the first request specifying an electronic document;
responsive to determining that the electronic document is missing from a file cache, identifying, based on a load balancing scheme, an HTTP server and requesting the electronic document from the HTTP server;
generating, based on a template file, a code implementing a second request for loading a static object residing on the server-side HTTP proxy server, the second request comprising an application performance monitoring (APM) parameter of an application being executed by the client computing device, wherein the APM parameter is represented by one of: an amount of data transferred by the application, a number of requests issued by the application within a given time period, a processor usage level at the client computing device, an amount of memory available to the application, a server response time measured by the application, or a number of errors received in response to requests transmitted by the application;
inserting the code into the electronic document;

transmitting the electronic document to the client computing device;

responsive to receiving, from the client computing device, a third request for loading the static object identified by the code, transmitting to an APM system a message comprising at least part of the third request and the value of the APM parameter specified by the third request; and creating a log record comprising at least part of the third request.

16. The computer-readable non-transitory storage medium of claim 15, wherein the static object is provided by a transparent single-pixel image.

17. The computer-readable non-transitory storage medium of claim 15, wherein the code comprises a Javascript function.

18. The computer-readable non-transitory storage medium of claim 15, wherein transmitting the message to the APM system is performed over a dedicated connection.

19. The computer-readable non-transitory storage medium of claim 15, wherein the electronic document retrieved from the HTTP server comprises a second code for loading a second static object residing on the HTTP server.

20. The computer-readable non-transitory storage medium of claim 15, wherein the message further comprises a transaction identifier.

\* \* \* \* \*

UNITED STATES PATENT AND TRADEMARK OFFICE
CERTIFICATE OF CORRECTION

PATENT NO. : 10,103,961 B2
APPLICATION NO. : 14/340805
DATED : October 16, 2018
INVENTOR(S) : Ethan Luke Michaud et al.

Page 1 of 1

It is certified that error appears in the above-identified patent and that said Letters Patent is hereby corrected as shown below:

On the Title Page

Item (73), Assignee name reads --Teacher Insurance and Annuity Association of America (New York, NY)-- should read --Teachers Insurance and Annuity Association of America (New York, NY)--

Signed and Sealed this
Seventh Day of July, 2020

Andrei Iancu
*Director of the United States Patent and Trademark Office*